United States Patent [19]

Spiegel

[11] Patent Number: 5,551,290

[45] Date of Patent: Sep. 3, 1996

[54] LEAK DETECTOR

[76] Inventor: Bill Spiegel, 1412 SE. Carnahan Ave., Arcadia, Fla. 33821

[21] Appl. No.: 258,440

[22] Filed: Jun. 10, 1994

[51] Int. Cl.⁶ .............................. G01M 3/04; G01F 23/30
[52] U.S. Cl. .................. 73/311; 73/49.2; 73/322
[58] Field of Search .................... 73/40, 49.2, 311, 73/319, 322, 305, 290 R; 116/110, 227, 228; 340/624

[56] References Cited

U.S. PATENT DOCUMENTS

| | | | |
|---|---|---|---|
| 1,193,744 | 8/1916 | Wilkinson | 73/311 |
| 1,344,663 | 6/1920 | Waldrep | 73/311 |
| 2,086,645 | 7/1937 | Staber | 73/290 R |
| 2,510,663 | 6/1950 | Schuessler | 73/311 |
| 2,934,953 | 5/1960 | Anderson | 73/319 |
| 3,460,386 | 8/1969 | Guignard | 73/311 |
| 3,538,746 | 11/1970 | Jacobs et al. | 73/49.2 |
| 4,646,560 | 3/1987 | Maresca, Jr. et al. | 73/49.2 |
| 4,751,841 | 6/1988 | Biard et al. | 73/49.2 |
| 5,245,874 | 9/1993 | Baer | 73/319 |

FOREIGN PATENT DOCUMENTS

1809320A1  4/1993  U.S.S.R. .................... 73/305

Primary Examiner—William A. Cuchlinski, Jr.
Assistant Examiner—Andrew Hirshfeld
Attorney, Agent, or Firm—Frank A. Lukasik

[57] ABSTRACT

A device for detecting leaks in containers that are open to the effects of rain and/or evaporation comprising an outer cylinder or container suspended in a container or vessel to be measured, such as, a swimming pool, an inner tube, an outer floating tube, an inner floating indicating rod and a float attached to the end of the floating indicating rod. The device is suspended in a swimming pool by a chain or rope attached to the outer cylinder. The inner tube is fastened to the bottom of the outer cylinder and a hole is formed in the bottom of the outer cylinder and an optional, long capillary tube is inserted in the hole. The inside of the outer cylinder is filled to a particular level and the relationship of the floating indicator rod and the environmentsl indicator tube is recorded. Periodically, the level is checked to see if there is a change in the level due to a leak in the pool or container. The relationship of the floating indicator rod and the environmental indicator tube indicates a net leak in the pool or vessel being tested.

2 Claims, 5 Drawing Sheets

LEAK DETECTOR

BACKGROUND OF THE INVENTION

1. Field of the Invention

The present invention relates generally to detecting leaks in containers that are open to the effects of rain and/or evaporation, and more particularly, to detecting leaks in swimming pools.

2. Discussion of the Prior Art

The accurate measurement of the contents of a sunken tank or an open container at any desired time has presented a problem to the trade, and numerous objections have arisen to the methods heretofore employed for this purpose.

It is well known by swimming pool operators that a pool will suffer a considerable loss of water due to evaporation. It is also well known that the operator of a gasoline filling station suffers annually considerable loss due to leakage and evaporation of the gasoline in the sunken tank. A leaking pool is more likely to happen and very difficult to detect, especially in dry climates.

Several prior art portable fluid level gauges are available. U.S. Pat. No. 1,908,196 to Talbot discloses a portable liquid level gauge which comprises a relatively long metal cylinder having a perforate closure at the bottom and a plug closing the top, the plug having a central aperture and a recess providing a gauge bar seat of non-circular cross section, a gauge bar of non-circular cross section at its base, the base being adapted to be removably received in the seat and the gauge bar having a plurality of faces, each face being marked for a different tank and being adapted to occupy a plurality of angular positions in its seat, a metal float within the cylinder, and a float level indicating rod on the float, the rod passing through the aperture in the plug, and the extremity thereof in association with the markings on one face for the gauge bar to indicate the liquid contents of the tank.

U.S. Pat. No. 2,232,921 to Kuhlman discloses a barrel gauge, comprising a tube, open at both ends, and extending from the upper end of the tube to a point adjacent its lower end is a narrow slot. The calibrated member that is arranged to slide freely through the tube is formed of metal and square or non-circular in cross section. The ends of the rod are plugged to increase its buoyancy. Secured to the lower end portion of the graduated member is a float which may be of cork or other light material held in place on the rod by a one piece resilient gripping member. Formed through the float is an axial opening that is slightly larger in diameter than the tube and the resilient arms bear against the surface of the body of the float surrounding the opening and as the arms tend to flex outwardly or spread apart they engage and grip the float with friction and pressure. The graduated rod being connected to the float will be held in position with its upper portion projecting above the upper end of the tube and the reading of the graduated mark that appears in line with or just above the upper end of the tube will denote the liquid contents within the barrel.

U.S. Pat. No. 3,691,839 to Lasher discloses a portable gauge for measuring the fluid contents of a container having an opening circumscribed by a substantially horizontal wall portion, the gauge having a base adapted to rest on the wall portion, a transparent float extended through the base for free elevational movement with respect thereto, and a scale extended longitudinally of the float adjacent to the base for visual comparison therewith, the scale being calibrated in terms of the volumetric contents of the container at various fluid levels therein.

U.S. Pat. No. 3,983,752 to Holt discloses an oil level gauge for vehicles which have an oil reservoir in a relatively inaccessible location. An upright tube of small diameter has an open lower end below the lowest level of oil in the reservoir, and an upper end which is in a location that is readily viewed by a person checking the oil level. A gauge rod in the tube has a float at its lower end and has a bright colored enlargement at its upper end which is visible through a sight glass in a fitting that surmounts and seals the top of the tube. The float and the enlargement serve to guide the rod.

SUMMARY OF THE INVENTION

The structure of the present invention combines an outer cylinder, suspended in a container being measured, such as, for example a swimming pool or tank, an inner tube, an outer floating tube, and an inner floating indicating rod. The assembly is suspended in a swimming pool by a chain or rope attached to the outer cylinder. The inner tube is fastened to the bottom of the outer cylinder and a hole is formed in the bottom of the outer cylinder. If surging is present, an optional, long capillary tube is inserted in the hole. The capillary tube is placed on the bottom of the pool to prevent surges in the pool level indicating rod. The inside of the outer cylinder is filled to a particular level and the relationship between the two floats is recorded. Periodically, the level is checked to see if there is a change in the relationship between the two floats by reading the gauge marks on the floating indicating rod.

DESCRIPTION OF THE PREFERRED EMBODIMENT

Figure 1:
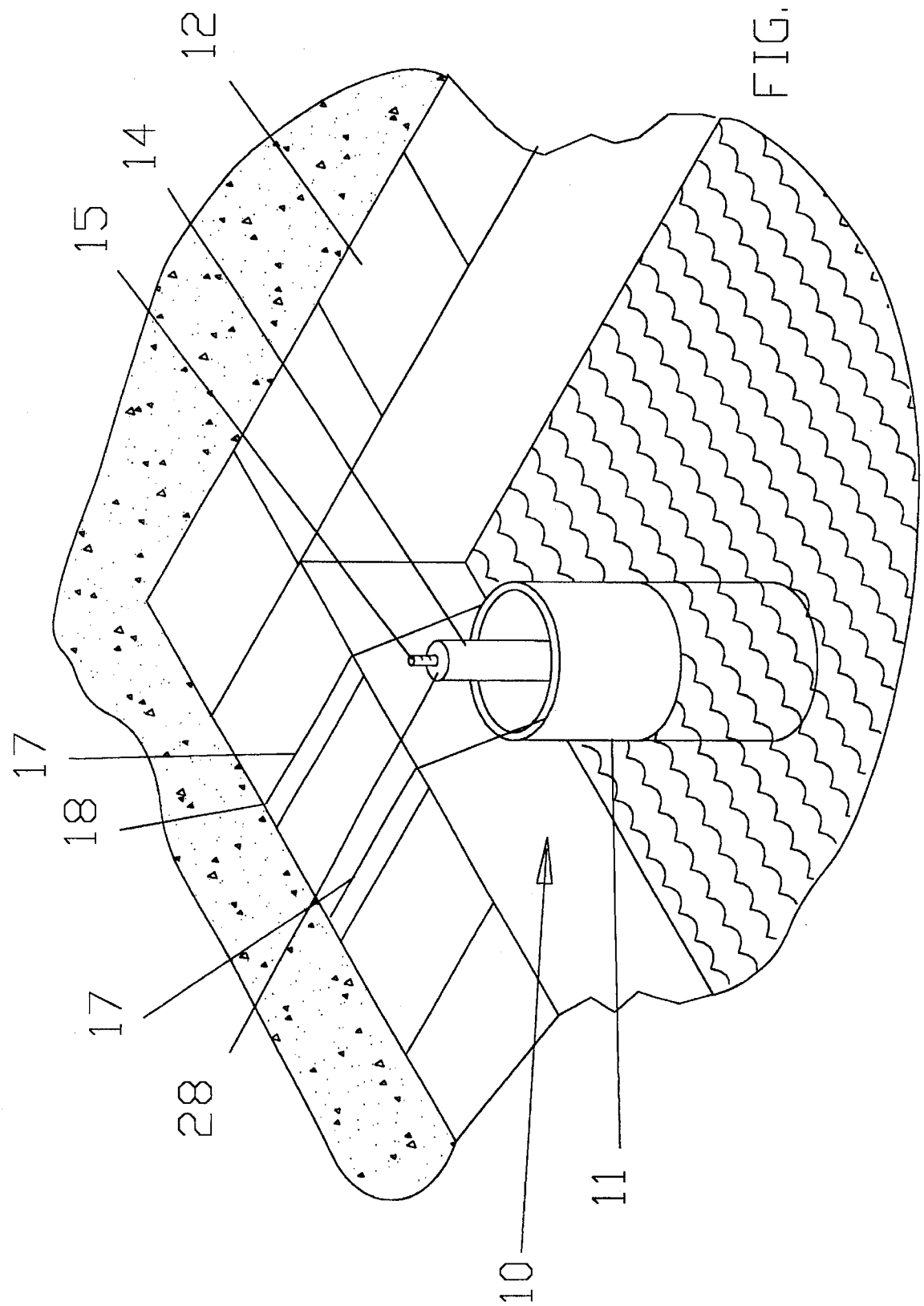
FIG. 1 is a perspective plan view of the leak detector of the present invention suspended in a swimming pool.
Figure 2:
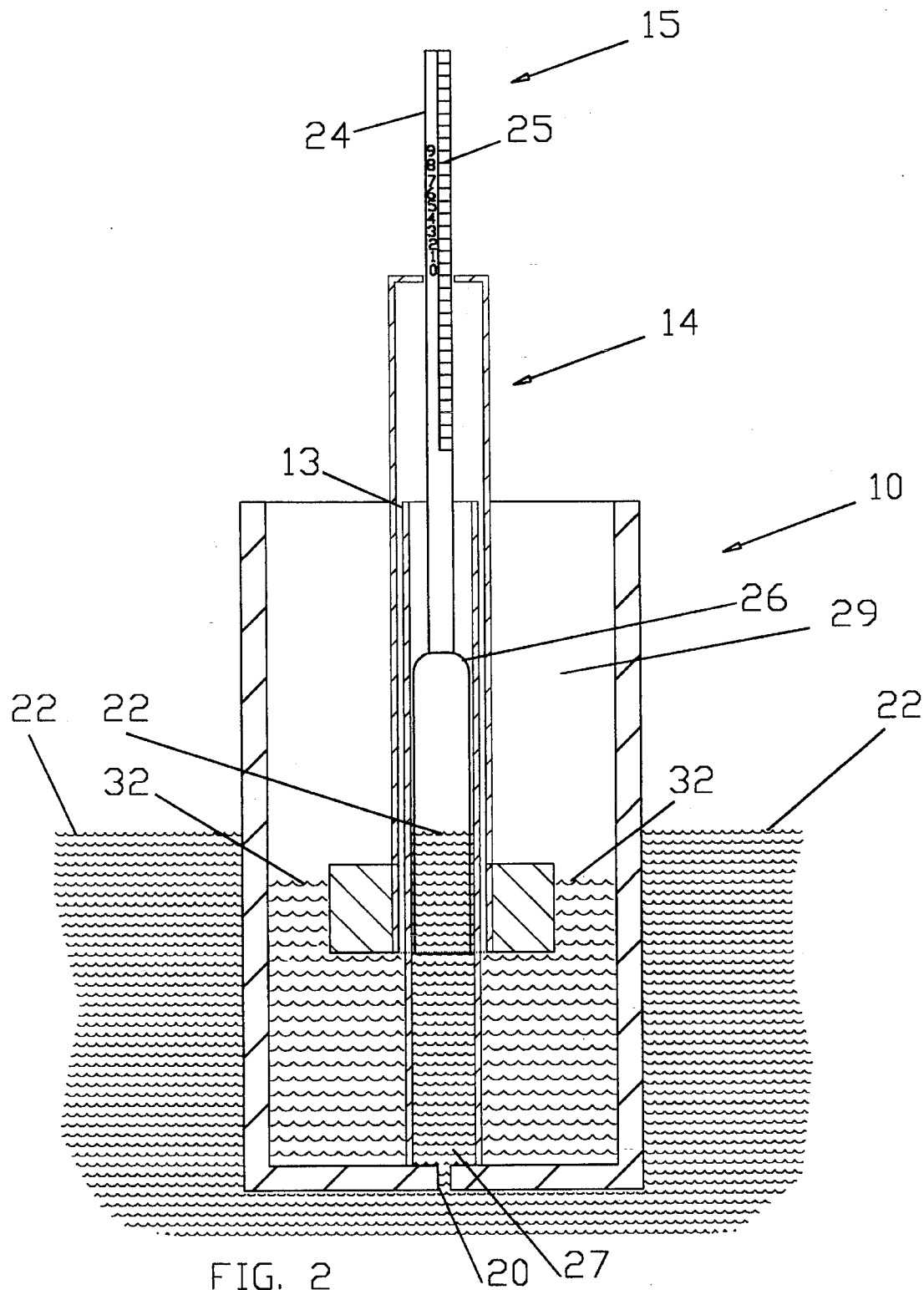
FIG. 2 is a sectional view of the leak detector of the present invention showing the liquid levels.
Figure 3:
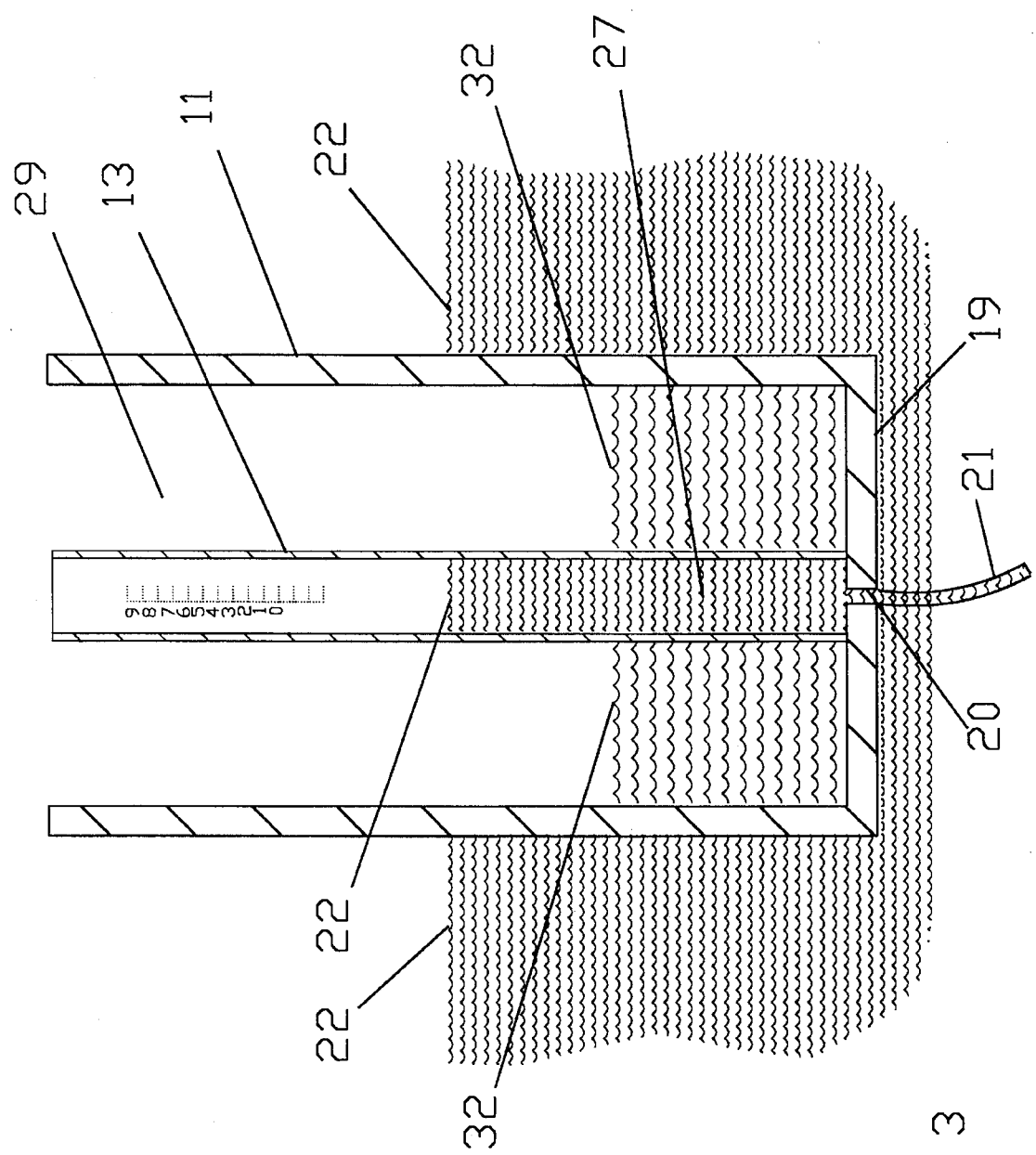
FIG. 3 is a sectional view of the outer cylinder and an inner tube assembled in accordance with the present invention.
Figure 6:
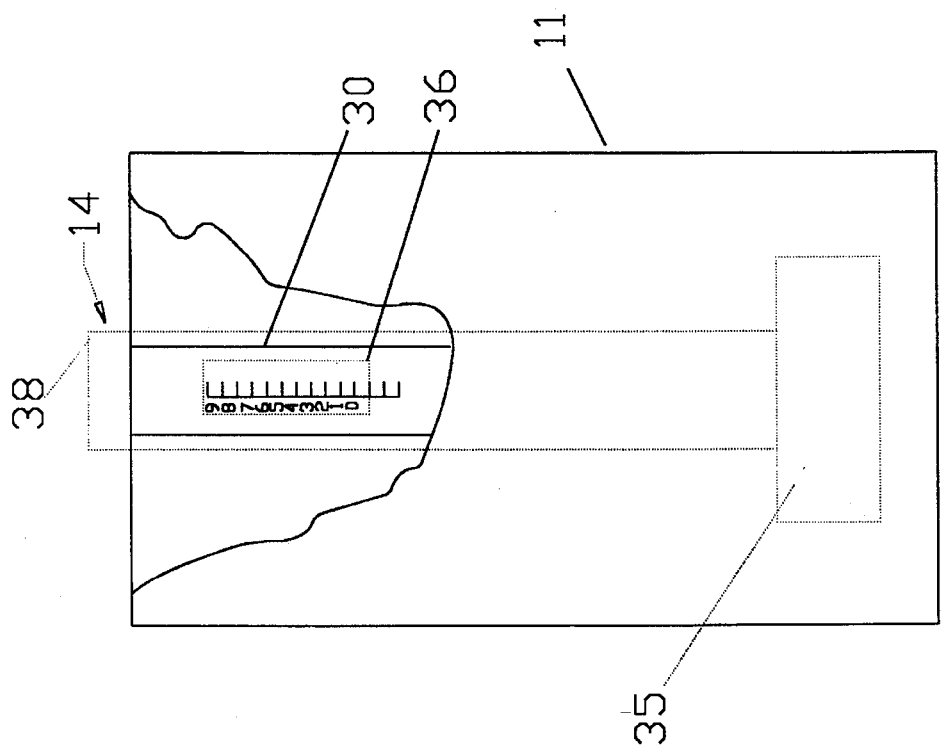
FIG. 6 is a side view the outer cylinder, partly cutaway, to show an outer floating tube installed over the inner tube.
Figure 5:
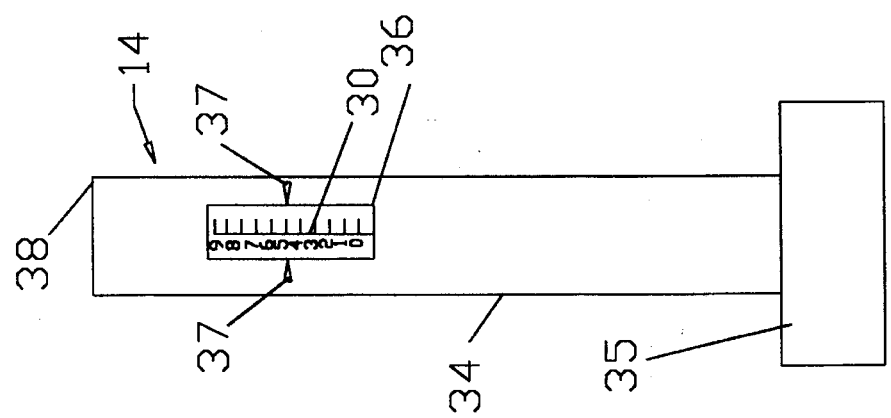
FIG. 5 is a side view of an outer floating tube in accordance with the present invention.
Figure 4:
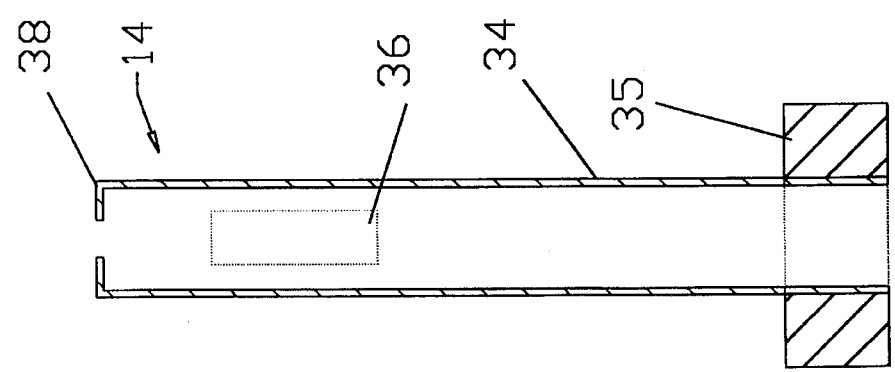
FIG. 4 is a sectional view of an outer floating tube in accordance with the present invention.

Referring to the drawings in detail, and referring first to FIG. 1, there is illustrated the leak detector of the invention, designated by the numeral 10. Leak detector 10 is comprised generally of an outer cylinder 11, suspended in a swimming pool 12, or the container being measured, by a chain or rope 17 attached to outer cylinder 11 and then fastened to an edge 18 located on the swimming pool 12. An inner tube 13 is fastened to the bottom 19 of outer cylinder 11 as shown in FIG. 3. A hole 20 is formed in bottom 19 and a long capillary tube 21 may be inserted in the hole 20. The capillary tube 21 is placed on the bottom of the pool 12 to prevent surges in the pool level 22 and thus steady the level of the inner floating indicating gauge 15 when surging is present.

Figure 7:
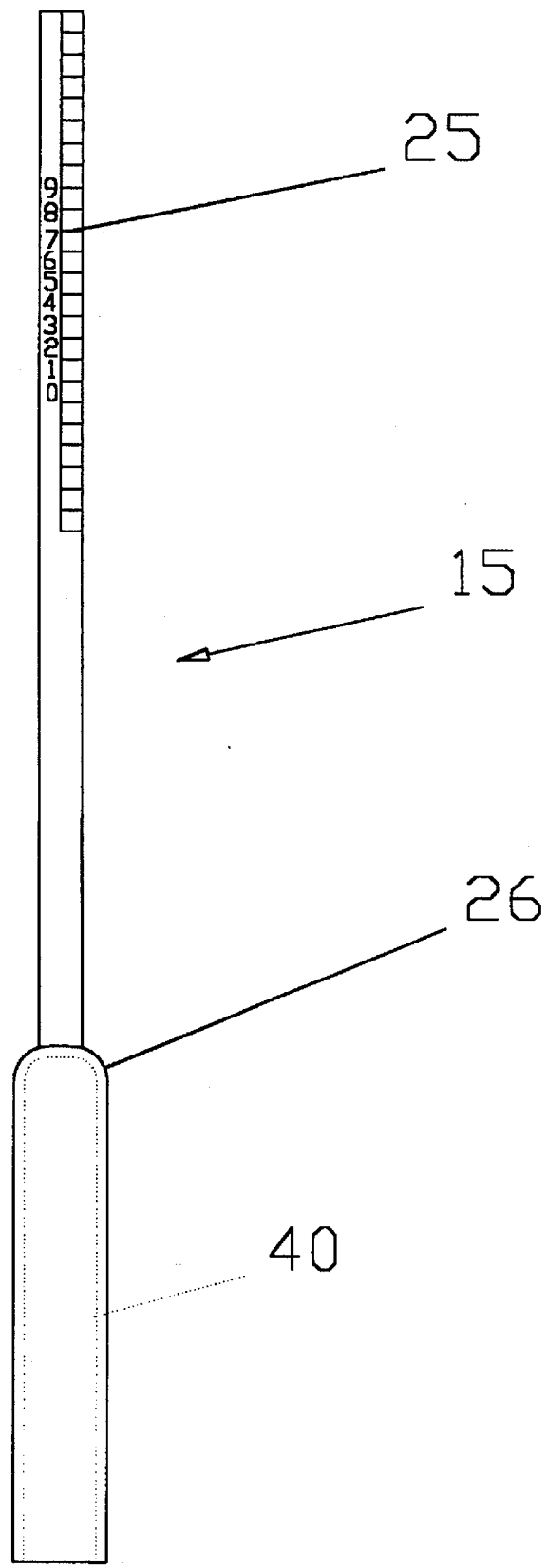
FIG. 7 is a side view of an inner, floating, indicating rod in accordance with the present invention.

Inner, floating, indicating gauge 15, shown in FIG. 7, consists of a rod 24 having graduated lines 25 at the top end and float 26 at the opposite end. Indicating gauge 15 floats in inner chamber 27, formed by attachment of inner tube 13 to bottom 19 of outer cylinder 11. Indicating gauge 15 provides an actual indication of the level 22 of the pool or vessel being tested. Guide cap 28 is placed over the top of environmental indicator 14 to guide indicator gauge 24 and to provide a reference point to take a reading from graduated lines 25 of indicator gauge 24. Environmental compensation chamber 29 is formed within the area between the outer cylinder 11 and the inner tube 13. Graduations 30 are marked on the exterior of inner tube 13 for use as a rain gauge or evaporation gauge. Inner chamber 27 fluid level 22 and container fluid level 22 are shown in FIG. 3 at the same level, which is kept level by action of water inlet 20 and capillary tube 21.

Environmental indicator 14 consists of tube 34 and float 35. Environmental indicator 14 slides over inner tube 13 and floats on the liquid level 32 of compensation chamber 29. The liquid level 32 is determined by reading the level mark as indicated by the reference line 37 of environmental indicator 14, on graduations 30 located on inner tube 13. Graduations 30 are used to measure the change of liquid level 32 due to rain or evaporation of the liquid in compensation chamber 29. Graduations 25 are provided on indicating gauge 15 for measuring the net difference of the inner chamber 27 liquid level 22 and the environmental compensation chamber 29 liquid level 32. A secondary feature of the environmental indicator 14 is its ability to indicate the net effect of rain and evaporation, which is determined by reading the change that has occurred in the environmental compensation chamber 29 by reading the reference line 37 relationship with graduation 30 on inner tube 13. An optional viewing port 36 may be provided if environmental indicator 14 is not made of a transparent material.

In a preferred embodiment outer cylinder 11, inner tube 13, and tube 34 were made of PVC pipe although any suitable plastic material may be used. Float 26 contains an optional air chamber 40 to provide the necessary buoyancy. Floats 35 and 26 may be made of cork, air, or foam plastic or any other suitable flotation material and may be held in holding position by friction or it may be cemented or fastened to tube 34.

The primary purpose of the instant invention is to solve a problem that exists in determining if containers that are open to the effects of rain and/or evaporation are leaking or not. These two factors often make it difficult to determine if the loss of liquid in a container is increased by evaporation or masked by rainfall. The instant invention compensates for these two factors and effectively makes it possible by reading one gauge to determine the actual loss due to a leak in the container being measured. This is accomplished by the use of two containers suspended in the container being measured. An inner floating indicating gauge 15 floats inside of the inner chamber 27 and responds to the gross level change that occurs in the container 12 being measured. The environmental indicator 14 floats in the environmental compensation chamber 29 and responds only to environmental changes. The net difference is read on the graduations 25 and it's change in relationship with the top edge 38 of the environmental indicator 14. This change is the actual loss that occurred in the container 12 being measured.

Of course, it should be understood that a wide range of changes and modifications can be made to the preferred embodiment described above. It is therefore, intended that the foregoing descriptions be regarded as illustrative rather than limiting, and that it can be understood that it is the following claims, including all equivalents, which are intended to define the scope of the invention.

What is claimed is:

1. A liquid level indicating device for detecting a leak in a liquid container that is open to the effects of rain and evaporation, said device comprising:

an outer cylinder suspended in a liquid in a container and partially submerged in said liquid in said container, said outer cylinder having a bottom with a hole formed vertically through the center and an inner tube having a bottom edge fastened to said bottom thereby forming an inner chamber above said hole for holding a volume of said liquid at the liquid level of said container, and an environmental compensation chamber formed between said inner tube and said outer cylinder for holding a reference volume of liquid to measure environmental changes in liquid volume, an environmental indicator tube having a first end and a second end, and having a top edge cap at said first end for providing a reference point for taking readings, and a float fastened to said second end, said environmental indicator tube being inserted on and sliding over said inner tube and floating on said reference volume of liquid, and responding only to environmental changes, an inner floating indicating gauge inserted in said inner chamber and consisting of a rod having a first end with graduated lines formed thereon for indicating liquid level, said indicating gauge being inserted in, and guided by said environmental indicator tube top edge cap reference point, and a second end of said rod having a float formed thereon and floating on said container level volume of liquid at the level of the container liquid, said indicating gauge responding to gross liquid level changes in the container, whereby a net difference of liquid levels of said inner chamber and said environmental compensation chamber is indicated on said inner floating indicating gauge graduations by the change in relationship with said environmental indicator top edge cap.

2. A liquid level indicating device of claim 1 wherein a capillary tube is inserted in said hole formed in said outer cylinder bottom for preventing surges in said inner chamber.

* * * * *